United States Patent
Castellan

[11] Patent Number: 5,212,929
[45] Date of Patent: May 25, 1993

[54] UNIT TO FEED AND STACK LAYERS OF SECTIONS

[75] Inventor: Bruno Castellan, Farra d'Isonzo, Italy

[73] Assignee: Danieli & Co. Officine Meccaniche SpA, Buttrio, Italy

[21] Appl. No.: 825,087

[22] Filed: Jan. 24, 1992

[30] Foreign Application Priority Data

Jan. 25, 1991 [IT] Italy ............................ UD91A000009

[51] Int. Cl.[5] ........................ B65B 19/34; B65B 35/56
[52] U.S. Cl. .................................... 53/149; 53/540; 53/544; 198/374; 198/468.2; 198/468.4; 414/732; 414/736; 414/742; 414/788.3
[58] Field of Search .............. 53/148, 149, 150, 535, 53/537, 540, 544; 414/681, 732, 736, 742, 788.3, 791.4; 198/374, 468.2, 468.5, 468.4, 486.2

[56] References Cited

U.S. PATENT DOCUMENTS

| | | | |
|---|---|---|---|
| 3,066,786 | 12/1962 | Allgeyer | 414/736 X |
| 4,077,523 | 3/1978 | Spanke | 414/742 X |
| 4,184,800 | 1/1980 | Uchida et al. | |
| 4,278,377 | 7/1981 | Elineau | 414/791.4 X |
| 4,566,833 | 1/1986 | Gigante | 414/736 X |
| 4,648,770 | 3/1987 | Berz et al. | 414/791.4 X |
| 4,846,625 | 7/1989 | Gabillet | 414/736 X |
| 5,001,890 | 3/1991 | Mansutti | 53/544 X |
| 5,081,818 | 1/1992 | Poloni | 53/544 X |

FOREIGN PATENT DOCUMENTS

| | | |
|---|---|---|
| 318772 | 6/1989 | European Pat. Off. |
| 406573A1 | 1/1991 | European Pat. Off. |
| 2600856 | 7/1977 | Fed. Rep. of Germany ... 414/791.4 |
| 0233109 | 2/1986 | Fed. Rep. of Germany ... 414/791.4 |
| 3715887 | 11/1988 | Fed. Rep. of Germany ... 414/791.4 |

Primary Examiner—John Sipos
Assistant Examiner—Linda Johnson
Attorney, Agent, or Firm—Antonelli, Terry, Stout & Kraus

[57] ABSTRACT

Unit (10) to feed and stack layer of sections, which is located downstream of a layer-forming platform (11) and upstream of a packaging assembly (32), the layer-forming platform (11) comprising a plurality of conveyors (29), the unit (10) consisting of a plurality of first manipulator arms (40) and a plurality of second manipulator arms (41) able to rotate about an axis (42) parallel to the lengthwise axis of the sections to be packaged, the manipulator arms (40–41) bearing layer manipulators (35–36) able to move lengthwise along the manipulator arms (40–41) in the transient state of rotation of the movable manipulator arms (40–41), the layer manipulators (35–36) having an engagement position (45) arranged substantially at the front of and external to their relative manipulator arms (40–41).

7 Claims, 3 Drawing Sheets

UNIT TO FEED AND STACK LAYERS OF SECTIONS

This invention concerns a unit to feed and stack layers of sections.

The unit according to this invention is fitted to layer-forming platforms sited immediately downstream of assemblies which make parallel and butt the layers of sections.

The invention is suited to rolling plants and is located in the so-called finishing and despatch area immediately upstream of the packaging unit.

Layer-forming platforms 11 the downstream end of which is shown as an example in FIG. 1 are known. These layer-forming platforms 11 comprise at their downstream end a plurality of conveyors 29 which convey sections already sorted, aligned and butted for packaging.

If the sections are, for instance, angle irons, the package 30 being formed includes one layer with a number "n" of sections, the next layer with a number "n minus 1" sections upside-down as compared to the first layer, the successive layer with "n" sections and so on.

The layer-forming platform 11 is equipped to deliver to a layer feeder-stacker unit 10 either sections assembled as "n sections" or sections assembled as "n minus 1 sections", the number "n" being variable according to the width of the package to be made.

In the example shown a first layer end stop 13 cooperates with the conveyors 29, and a second layer end stop 12 cooperates with the conveyors 29 upstream of the first end stop 13 and is of a retractable type in this case.

FIG. 1 shows an example of the first step, in which the first end stop 13 retains a layer 37 to be fed right-way-up, namely uninverted, whereas the second end stop 12 retains a layer 38 to be fed upside-down.

In the second step the layer 38 to be fed upside-down will take the place of the layer 37 to be fed uninverted from the layer-forming platform 11 when the first layer 37 has been removed by the feeder-stacker unit 10.

FIG. 4, instead, shows an example of the second step in which the second end stop 12 retains another layer 39 to be fed uninverted, whereas the first end stop 13 retains the layer 38 to be fed upside-down.

In some lay-outs the layers 37-38 are fed substantially in sequence without any overturning.

The pre-setting of the numbers "n" and "n minus 1" of sections is achieved with other layer end stops located upstream of those shown in FIG. 1, but these other end stops are not shown here since the details described so far are part of the state of the art and are unimportant for the purposes of this invention.

In the state of the art the already sorted, aligned and butted layers are halted by the first end stop 13 and are engaged by a layer feeder-stacker unit which may consist, for instance, of a magnet borne on a stacker arm actuated by a drive unit.

Layer feeder-stacker units are disclosed, for instance, in IT-A-83446/88, IT-A-83464/88 and IT-A-83452/89.

IT-A-83446/88 discloses a device to package sections in alternate layers with one single set of magnetic heads.

IT-A-83464/88 discloses a turret type packaging device. However, both the devices disclosed in the above documents entail the great shortcoming of taking up considerable lateral space so as to enable them to carry out their movements and also of requiring great vertical space.

Moreover, they employ magnetic heads to engage the sections and therefore cannot employ their magnetic feeder-stacker units to handle sections which do not consist of ferrous material.

Furthermore, these feeder-stacker units are characterized in that the means to take the layers carry out a rotary movement of 360° with all the relative problems of feeding to and through the rotary shaft the power and drive required to actuate the various mechanisms included in the rotary parts.

Persons skilled in this field know that rotary manifolds are a source of many difficult problems.

Such layer feeder-stacker units, so as to reduce their overall vertical bulk, can be positioned in pits at a level lower than the layer-forming platform, but this entails a great increase in installation costs.

Moreover, in the existing layer feeder-stacker units able to feed layers uninverted or upside-down the layers to be stacked on the package being formed have to be retained by engagement combs included on the magnets so as to ensure engagement and lateral stability.

These engagement combs have to be shaped like the sections to be handled and therefore have to be changed whenever the shape of the section is changed. This entails very heavy downtimes spent in changes of production and equipment, high maintenance costs and a considerable number of processing parts and also reduced output.

Moreover, the packages formed can of necessity not be very high and therefore the output of the packaging devices is not very great.

IT-A-83452/89 discloses a rotary packaging device in which the sections are engaged by at least one pair of manipulator hands comprised in rotary sectors; but the device disclosed in this document requires that two layers to be handled are side by side but spaced apart sideways when they reach the packaging device, and also requires a great number of moving parts with resulting heavy maintenance costs owing to the complex nature of the mechanisms comprised.

The present applicant has therefore tackled this problem and has designed, tested and embodied this invention.

The invention can be fitted to rolling plants and is applied to layer-forming platforms included immediately downstream of the plurality of conveyors and to layers of sections already sorted, positioned parallel and butted immediately upstream of a packaging assembly.

The invention can be fitted to the above or analogous plants irrespective of the types of layer end stops employed, whether the latter be magnetic, mechanical or of any other type.

The main purpose of the invention is to provide a device to feed layers of sections already sorted, made parallel and butted from the layer-forming platform to the packaging assembly.

If the sections are, for instance, angle irons, one layer out of two layers has to undergo not only the feeding motion but also an overturning motion of 180°, as compared to its position of arrival on the layer-forming platform, about the lengthwise axis of the sections so as to enable the next layer of sections to mate with the previous layer already comprised in the package being formed.

The device of the invention consists of a pair of manipulator arms, namely a first manipulator arm and a second manipulator arm respectively, pivoted substantially on the same axis at a right angle to the lengthwise axis of the conveyors; the manipulator arms can rotate by about 180° about their axis of pivoting.

In performing this rotation of 180° one manipulator arm passes from its engagement zone on the layer-forming platform to its delivery zone on the package being formed, while the other manipulator arm is displaced in the opposite direction.

The first and second manipulator arms are equipped at their ends with a manipulator to engage an upside-down layer and an uninverted layer respectively.

These manipulators for upside-down layers and uninverted layers have an engagement position and a delivery position.

According to the invention the manipulator for an upside-down layer is capable only of an axial feed motion in relation to the respective first manipulator arm, whereas the manipulator for an univerted layer is capable of a rotary feed motion in relation to the respective second manipulator arm. The rotary feed movement enables the manipulator for the uninverted layer to place on the package being formed the layer to be stacked uninverted with the same orientation that that layer had when it was taken from the layer-forming platform.

The relative feeding movement carried out by each layer manipulator on its respective manipulator arm has the effect that, when the manipulators pass each other, the layer manipulator in its return step always passes below the layer manipulator performing its feeding step.

The axial feed movement of the layer manipulators along their respective manipulator arms makes it possible, while keeping the manipulators substantially above the layer-forming platform, to reduce considerably the overall vertical bulk of the whole layer feeder-stacker unit.

This invention also enables the layer-forming platform to be kept at a maximum height of 100 cms. from ground level without any need to make pits or holes or special foundations.

The attached figures, which are given as a non-restrictive example, show a preferred embodiment of the invention and represent that preferred embodiment at successive moments of its working so as to make its working clearer, as follows.

Figure 1:
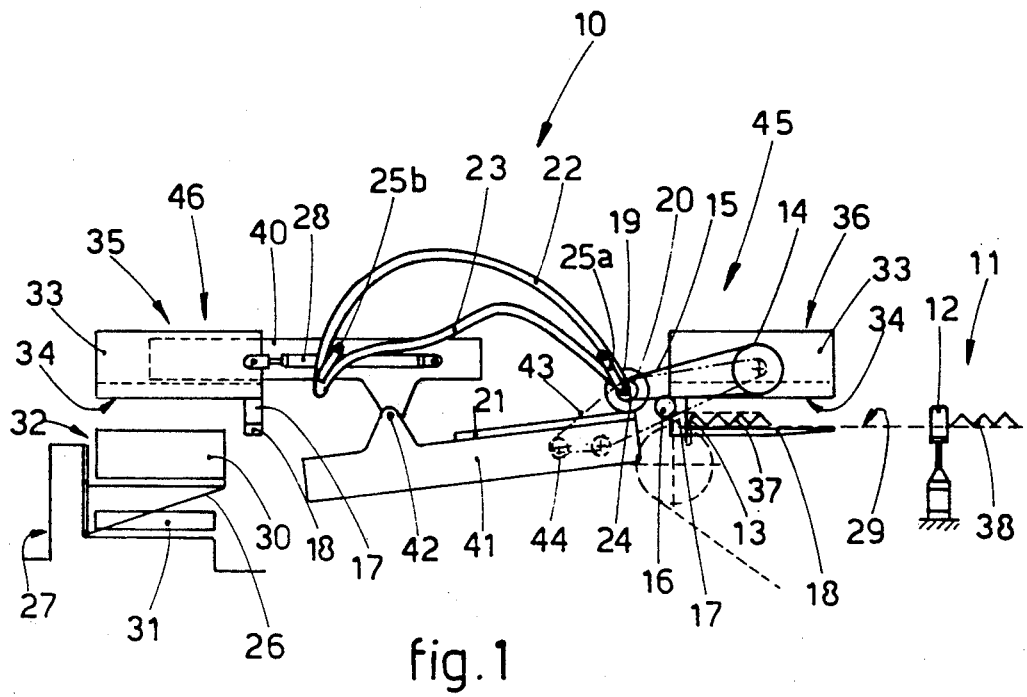
FIG. 1 shows a device according to the invention at the moment when the manipulator of an uninverted layer engages that layer, while the manipulator of an upside-down layer has just stacked its layer.

In the figures a feeder-stacker unit for layers is generally referenced with the number 10.

A packaging assembly 32 located downstream of the layer feeder-stacker unit 10 is shown as an example in the figures.

In this example a package 30 being formed is borne on a movable table 26 upheld by a package manipulator 27 and cooperating with a possible discharge roller conveyor 31.

The feeder-stacker unit 10 in this case consists of a manipulator 36 for uninverted layers 37 and a manipulator 35 for upside-down layers.

The manipulator 36 for uninverted layers 37 consists of a base 33 that cooperates by means of a gripper actuator 17 with a layer-gripper blade 18 positioned parallel to a gripper face 34 of the base 33.

The gripper face 34 is capable of movement along the axis of the gripper actuator 17. The movement of the gripper face 34 clamps the sections between the gripper blade 18 and the gripper face 34 in one direction and releases the sections in the other direction.

The gripper actuator 17 is capable of rotating by about 90° so as to rotate the gripper blade 18 from a position substantially normal to the lengthwise axis of the sections to a position substantially parallel to that axis.

The motion of rotation serves to free the sections from, or to create on the sections, the constraint of the gripper blade 18, so that the sections can be stacked on the package 30 being formed or taken from the layer-forming platform 11 respectively.

When a manipulator 36 for an uninverted layer is located at the end portion of the layer-forming platform 11 and is cooperating with the first end stop 13, the engagement of the layer to be fed takes place in the following steps (see FIG. 1):

the positioning of the manipulator 36 in such a way that the gripper face 34 of the base 33 is above, and substantially parallel to the upper surface of, the conveyors 29, while the gripper blade 18 is located below the upper surface of the conveyors 29, is substantially parallel to the lengthwise axis of the sections and is in a position coordinated with the first end stop 13;

the rotation of the gripper blade 18, owing to the rotation of the gripper actuator 17, from its position described above to a position substantially normal to the lengthwise axis of the sections;

the actuation of the movement of the gripper face 34 and the approach of the face 34 to the gripper blade 18 with a resulting clamping of the uninverted layer 37 between the gripper blade 18 and the gripper face 34.

In the case of a manipulator 35 for upside-down layers the engagement takes place substantially as described above for the manipulator 36 of uninverted layers except that the manipulator 35 for upside-down layers is positioned at 180° to the axis of feed of the sections on the layer-forming platform 11.

In fact, the positioning of the manipulator 35 of the upside-down layers is carried out in such a way that the gripper face 34 of the base 33 lies below and substantially parallel to the upper surface of the conveyors 29 (see FIG. 4).

As a result, the gripper blade 18 is located above the upper surface of the conveyors 29, substantially parallel to the lengthwise axis of the sections and in a position coordinated with the first end stop 13.

When a manipulator, whether it be a manipulator 36 for uninverted layers or a manipulator 35 for upside-down layers, is positioned at the packaging assembly 32, the stacking of the layer thus fed takes place as follows:

the positioning of the manipulator 36 or 35 in such a way that the gripper blade 18 is above and substantially parallel to the upper surface of the package 30 being formed;

actuation of the movement of the gripper face 34 and the resulting distancing of the gripper face 34 from the gripper blade 18, thus releasing the layer previously clamped between the gripper blade 18 and the gripper face 34;

rotation of the gripper blade 18, owing to rotation of the gripper actuator 17, from a position substantially normal to the lengthwise axis of the sections to a position substantially parallel to that axis, with a resulting stacking of the sections on the package 30 being formed. The manipulators 35-36 for upside-down layers and for uninverted layers are fitted to a first manipulator arm 40 and a second manipulator arm 41 respectively.

The first and second manipulator arms 40-41 are pivoted on the same axis 42 positioned parallel to the lengthwise axis of the sections and can rotate by about 180° about that axis 42.

The manipulator 36 for uninverted layers and the manipulator 35 for upside-down layers have a layer engagement position 45 and a layer stacking position 46.

In their engagement position 45 the manipulators 35-36 are positioned substantially in front of and outside their respective manipulator arms 40-41 so as to prevent obstruction of the layer to be engaged.

In their stacking position 46 the manipulators 35-36 are positioned outside, or advantageously at least partly within, the front part of their respective manipulator arms 40-41 so as to reduce the space required for the movement to stack the layer on the package 30 being formed.

In this example the manipulator 35 of the upside-down layer is moved on the first manipulator arm 40 by an actuator 28.

This actuator 28 is firmly secured to the first manipulator arm 40 and can move the manipulator 35 of the upside-down layers along the first manipulator arm 40.

In the case shown the second manipulator arm 41 is equipped with a rack 21, which is arranged along the second manipulator arm 41 and cooperates with an external gearwheel 19.

An internal sprocket wheel 20 and a roller 24 are fitted solidly and axially to the external gearwheel 19. During rotation of the second manipulator arm 41 about the axis 42 from the layer loading zone to the layer unloading zone the roller 24 can move along a stationary guide 22 for outward travel, whereas during rotation of the second manipulator arm 41 in the opposite direction the roller 24 can move along a stationary guide 23 for return travel.

The two stationary guides for outward travel 22 and return travel 23 respectively are joined together at their ends at the same points, that is to say, the beginning of the stationary guide for outward travel 22 coincides with the end of the stationary guide for return travel 23, whereas the beginning of the stationary guide for return travel 23 coincides with the end of the stationary guide for outward travel 22.

The outward and return stationary guides 22-23 thus combined form an endless circuit in this case for travel of the roller 24 in an anticlockwise direction.

At the two points where the outward and return guides 22-23 join together are included first and second movable catches 25a-25b which prevent the roller 24 running in the opposite direction along the guide along which the roller 24 has just travelled. To be more exact, the first movable catch 25a is arranged in the initial part of the stationary guide 22 for outward travel and prevents the roller 24 entering the stationary guide 23 for return travel; the first movable catch 25a, when it has been passed by the roller 24, is brought back to its working position by its own weight.

The second movable catch 25b, instead, is located in the initial part of the stationary guide 23 for return travel and prevents the roller 24 entering the stationary guide 22 for outward travel; the second movable catch 25b, when it has been passed by the roller 24, is returned to its working position by a return spring.

The internal sprocket wheel 20 is fitted solidly and axially to the external gearwheel 19 and may include a chain tightener 16.

The base 33 for the manipulator 36 for univerted layers is equipped with an overturning means 14, which in this case is a sprocket wheel. The overturning means 14 is connected to the internal sprocket wheel 20 by a transmission chain 15, which cooperates in this example not only with the internal sprocket wheel 20 and overturning means 14 but also with the chain tightener 16.

A carriage 44 able to move lengthwise along the second manipulator arm 41 is included within that arm 41.

The external gearwheel 19, internal sprocket wheel 20, roller 24 and overturning means 14 are fitted solidly to an element 43, which can move along the second manipulator arm 41 and is connected solidly to the movable carriage 44 included in the second manipulator arm 41.

The roller 24, while moving along the stationary guide 22 for outward travel, imparts a movement of rotary displacement to the external gearwheel 19 travelling on the rack 21.

The external gearwheel 19, being rotated and displaced, rotates and displaces with itself the internal sprocket wheel 20, which sets the overturning means 14 in rotation, while the element 43 is displaced together with the carriage 44 along the second manipulator arm 41.

The rotation of the internal sprocket wheel 20 is transmitted to the overturning means 14 by the transmission chain 15.

Thus, the manipulator 36 for uninverted layers is subjected to a displacement caused by the element 43 and by a rotary movement caused by the overturning means 14. The combination of these two movements leads to a rotary displacement of the manipulator 36 of uninverted layers.

Both the first and second manipulator arms 40-41 rotate by about 180° about the axis 42 and are moved substantially at the same time with opposite movements in relation to each other.

This rotation movement brings a manipulator (35-36) loaded with sections from the layer-forming platform 11 to the package 30 being formed in one direction at the same time as the other manipulator (36-35) free of sections is brought from the package 30 being formed to the layer-forming platform 11 in the other direction.

During this rotation movement the two manipulator arms, the first arm 40 and the second arm 41 respectively, meet substantially at a vertical position at about half of their rotation.

The manipulator 35 for upside-down layers is only displaced along the axis of the first manipulator arm 40; this displaement in this example takes place by operating the actuator 28 in one direction or the other.

The displacement of the manipulator 35 of upside-down layers towards the exterior of the first manipulator arm 40 takes place at the time of loading the layer of the sections to be fed at the layer-forming platform 11.

During the first half of the rotation of the first manipulator arm 40 from the layer-forming platform 11 to the package 30 being formed the actuator 28 is kept in its position of maximum elongation.

When the step of reciprocal passing of the manipulator arms 40-41 has taken place, the actuator 28 is operated gradually to make the manipulator 36 for uninverted layers return inwards so as to reduce the space required for its movement and so that the manipulator 35 for upside-down layers becomes positioned in correspondence with the package 30 being formed at the end of its rotation to the stacking position 46.

FIGS. 1 to 6 show a complete cycle of the first manipulator arm 40 and second manipulator arm 41 and also of the respective manipulators 35 for upside-down layers and 36 for uninverted layers.

FIG. 1 shows a device according to the invention at the moment when the first manipulator arm 40 is at the end of its travel in the layer-forming zone, with the corresponding manipulator 36 of uninverted layers in its engagement position 45, while the second manipulator arm 41 is at the end of its travel in the layer discharge zone, with the relative manipulator 35 of upside-down layers in its stacking position.

The manipulator 36 for uninverted layers engages its layer to be stacked right-way-up 37, while the manipulator 35 for upside-down layers has just stacked its own layer on the package 30 being formed.

Figure 2:
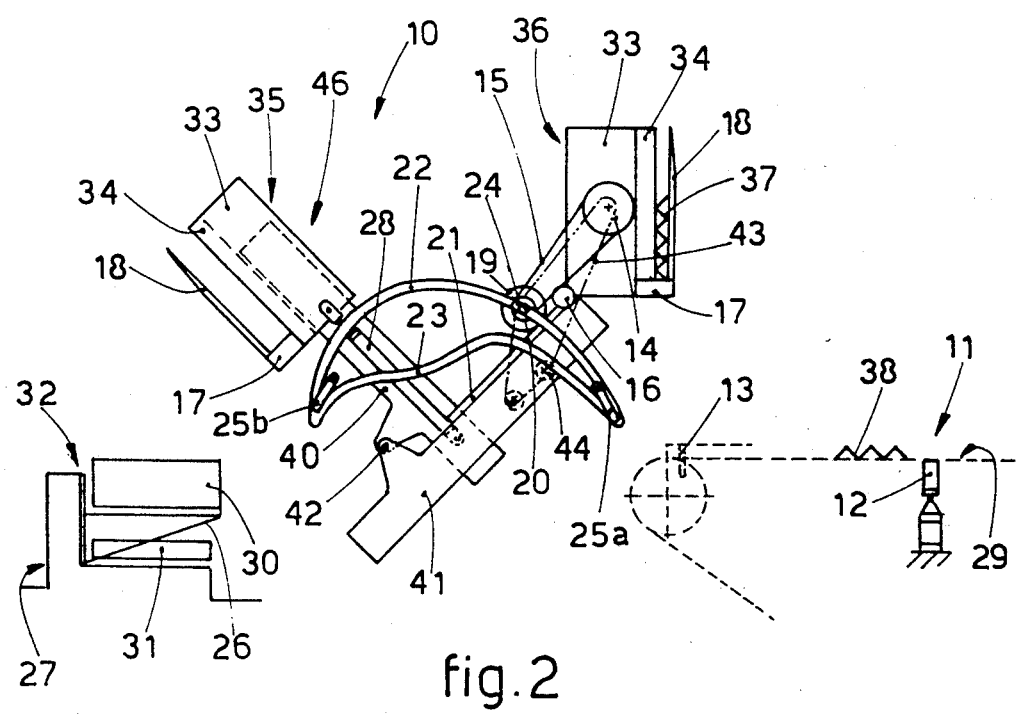
FIGS. 2 to 6 show the successive movements of the two manipulator arms and of the respective layer manipulators.
Figure 3:
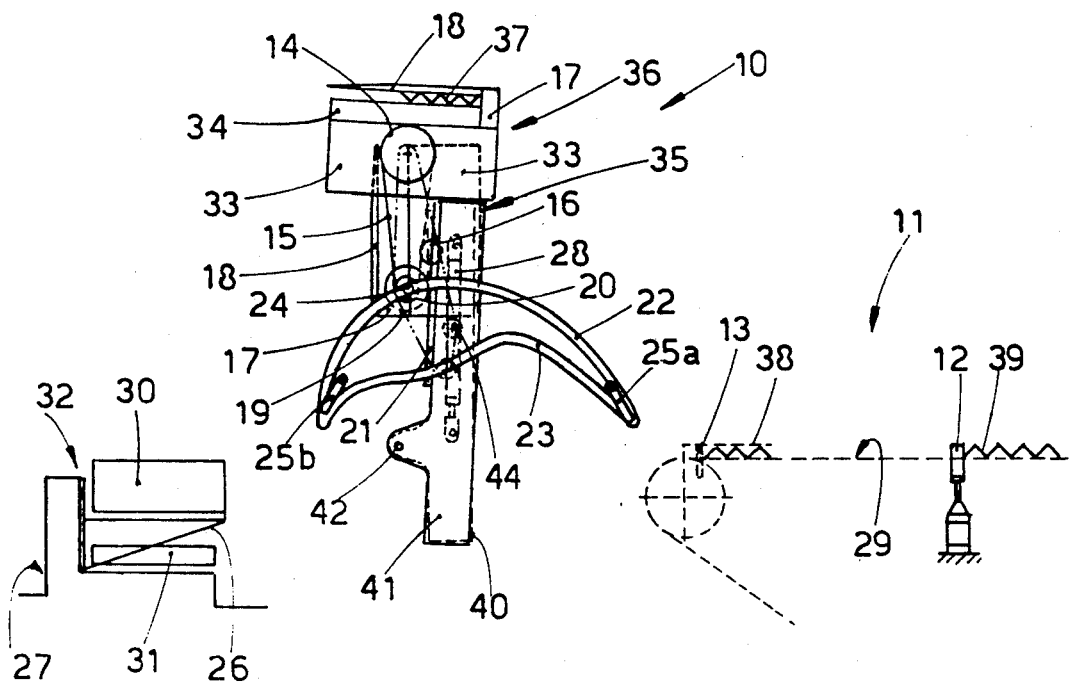
Figure 4:
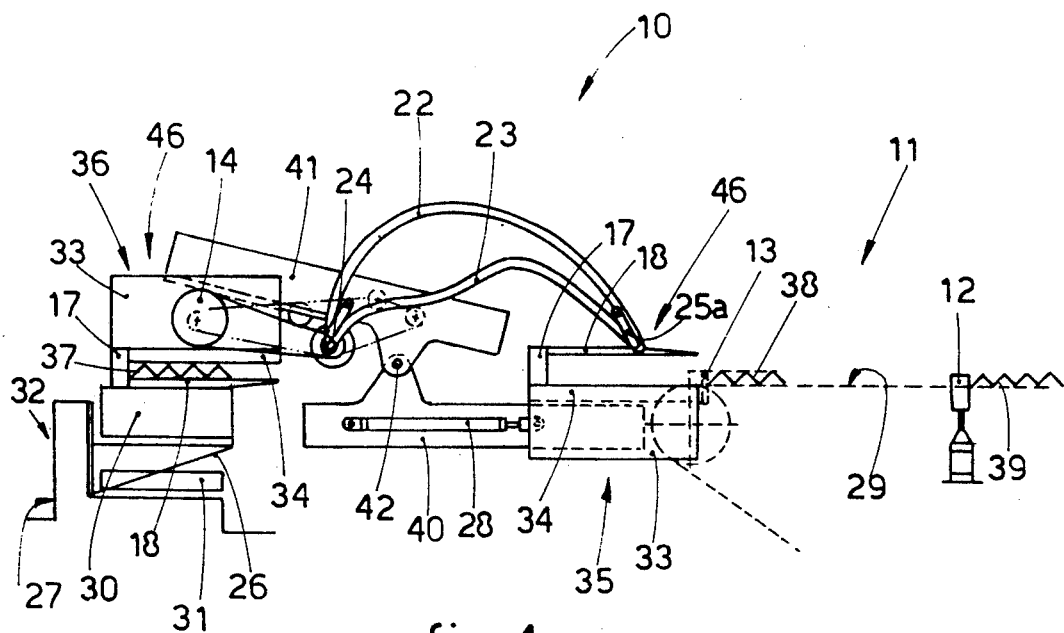

FIGS. 2 to 4 show successive steps of the reciprocal rotation of the first manipulator arm 40 and second manipulator arm 41 about their axis of rotation 42.

The first manipulator arm 40 carries out a rotation in a clockwise direction, in this example, about its axis of rotation 42 and thus bring the empty manipulator 35 of upside-down layers to the engagement position 45 at the layer-forming platform 11.

The second manipulator arm 41 carries out a rotation in an anticlockwise direction, in this example, about its axis of rotation 42 at the same time but in the opposite direction to the direction of rotation of the first manipulator arm 40.

During this rotation the element 43 is displaced along the lengthwise axis of the second manipulator arm 41 owing to the sliding of the carriage 44, in this case, within the second manipulator arm 41.

This displacement of the element 43 along the axis of the second manipulator arm 41 leads to the rotation of the manipulator 36 for uninverted layers about its own axis.

With the progressive elongation of its actuator 28 the manipulator 35 for upside-down layers now becomes positioned with its gripper face 34 below the conveyors 29 and substantially parallel to the layer-forming platform 11 and with its gripper blade 18 above the layer-forming platform 11.

The displacement of the gripper actuator 17 of the manipulator 35 for upside-down layers causes the clamping of the layer 38 of upside-down sections between the base 33 of the same manipulator 35 and the gripper blade 18 of the same manipulator 35.

At the same time, by acting on the motion of displacement of the gripper actuator 17 of the manipulator 36 for uninverted layers in the direction to distance the gripper blade 18 from the base 33 of that manipulator 36, the layer of uninverted sections 37 is released.

With the gripper blade 18 of the manipulator 36 for uninverted layers now brought from a position substantially normal to the lengthwise axis of the sections to a position substantially parallel to that axis the layer 37 of uninverted sections is stacked on the package 30 being formed.

During the whole of this first step the conveyors 29 are actuated according to the state of the art so as to feed the layer 38 to be delivered upside-down forwards until it cooperates with the first end stop 13.

In this way a layer 38 to be delivered upside-down is made available to the feeder-stacker unit 10, while a new layer 39 to be delivered uninverted enters into cooperation with the second end stop 12.

FIG. 4 shows the manipulator 36 for uninverted layers a moment before it stacks the layer 37 of uninverted sections on the package 30 being formed, while the manipulator 35 of upside-down layers is about to engage the layer 38 to be stacked upside-down.

Figure 5:
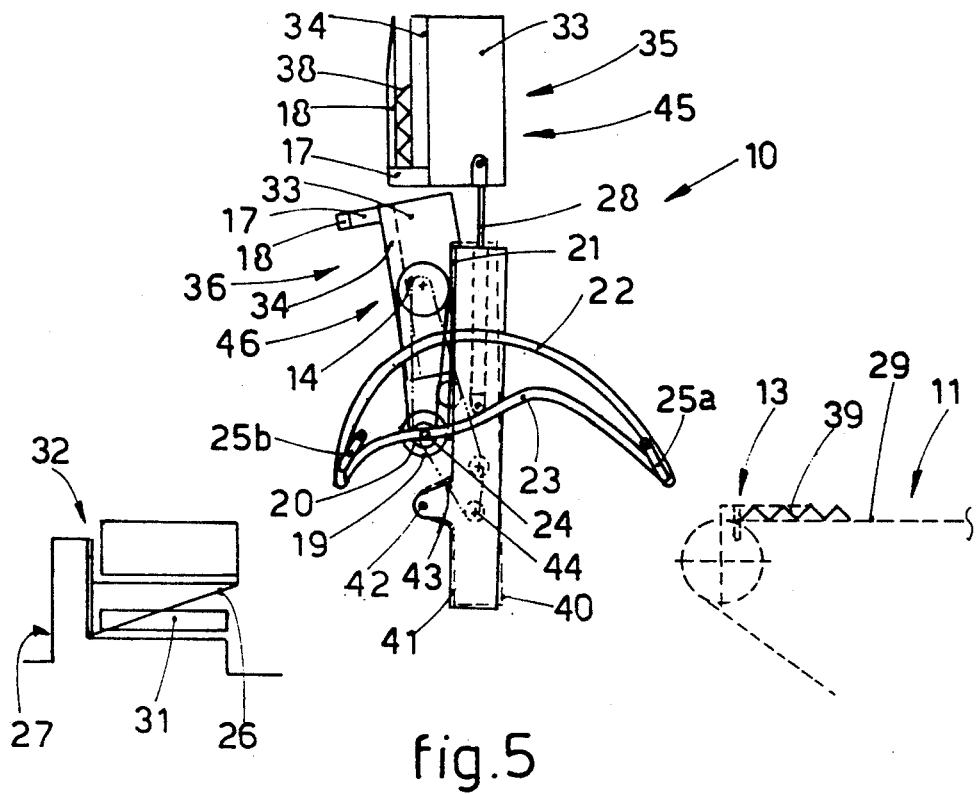

FIG. 5 shows the central step of the reciprocal rotation of the first manipulator arm 40 carrying an upside-down layer 38 and of the empty second manipulator arm 41.

During all the first half of this rotation the manipulator actuator 28 remains fully extended so as to keep the manipulator 35 of upside-down layers in its engagement position 45.

When the manipulators 35-36 have passed each other, the manipulator 35 of upside-down layers is displaced inwards so as to reduce the space required for its movement, by acting on the actuator 28, which thus brings that manipulator 35 to its stacking position 46.

The stationary return-travel guide 23 is conformed in such a way that during all the first half of the rotation of the second manipulator arm 41 there is no displacement of the element 43 in relation to the second manipulator arm 41.

As a result, during the first half of the return-travel rotation of the second manipulator arm 41 the manipulator 36 for uninverted layers remains in its stacking position 46 and performs no motion in relation to the second manipulator arm 41 so as to keep to a minimum the space required for movement and to reach the step of passing the other manipulator 35 in a position below the other manipulator 35.

When the manipulators 35-36 have passed each other, the movement of the roller 24 on the stationary return-travel guide 23 is such as to generate the movement of rotary displacement of the external gearwheel 19 travelling on the rack 21, thus causing a rotary displacement of the manipulator 36 for uninverted layers.

This rotary displacement of the manipulator 36 for uninverted layers about its own axis brings that manipulator 36 to its engagement position 45 with its gripper face 34 located above the layer-forming platform 11 and substantially parallel to that platform 11.

During this step the conveyors 29 are actuated in a known manner so as to provide the feeder-stacker unit 10 with another layer to be handled.

Figure 6:
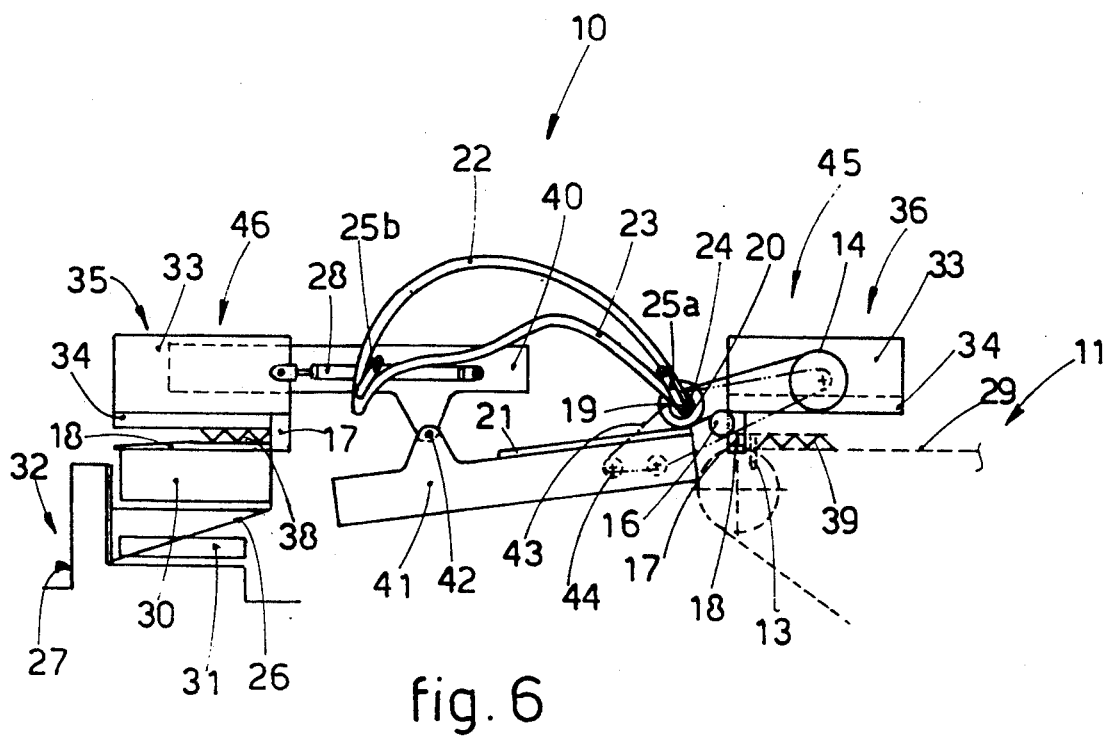

FIG. 6 shows the manipulator 35 of upside-down layers a moment before it stacks the upside-down layer 38 to be stacked on the package 30 being formed, while the manipulator 36 for uninverted layers is ready to engage a new layer 39 to be stacked uninverted.

I claim:

1. A feeder-stacker unit to feed and stack layers of sections, the feeder-stacker unit being located downstream of a layer-forming platform and upstream of a packaging assembly, comprising:

a conveyor to deliver sections in a longitudinal direction from the layer-forming platform to the feeder-stacker unit;

a first manipulator arm bearing a first layer manipulator movable lengthwise along the first manipulator arm and capable of retaining a layer of sections, the first manipulator arm being mounted for rotation about an axis transverse to said longitudinal direction and between the conveyor and the packaging assembly to enable the first layer manipulator to move between a position adjacent the conveyor and a position adjacent the packaging assembly; and a second manipulator arm bearing a second layer manipulator movable lengthwise along the second manipulator arm and capable of retaining a layer of sections, the second manipulator arm being mounted for rotation about an axis transverse to said longitudinal direction and between the conveyor and the packaging assembly to enable the second layer manipulator to move between a position adjacent the conveyor and a position adjacent the packaging assembly;

means for simultaneously rotating said manipulator arms in opposite directions to pass each other for moving layers from the conveyor to the packaging assembly;

and means for moving the first and second manipulators lengthwise along the first and second manipulator arms, respectively, while the arms are rotating to position the manipulators to pass each other.

2. A feeder-stacker unit according to claim 1, wherein the first manipulator arm and the second manipulator arm are mounted on a common axis.

3. A feeder-stacker unit according to claim 1, wherein each of the first and second layer manipulators is movable lengthwise along its respective first and second manipulator arms between an engagement position substantially in front of and external to its respective first and second manipulator arm and a stacking position at least partly retracted along a length of the manipulator arm.

4. A feeder-stacker unit according to claim 3, further comprising means for rotating the second layer manipulator with respect to the second manipulator arm about an axis transverse to said longitudinal direction.

5. A feeder-stacker unit according to claim 4, wherein the lengthwise movement of the first layer manipulator along the first manipulator arm is governed by an actuator.

6. A feeder-stacker unit according to claim 5, wherein the lengthwise movement of the second layer manipulator along the second manipulator arm comprises a rack arranged along the second manipulator arm and a gearwheel cooperating with the rack and operably connected to the second layer manipulator, the gearwheel being operably connected to a roller which moves along a stationary guide governing movement of the second layer manipulator.

7. A feeder-stacker unit according to claim 1, wherein each of the first and second layer manipulator comprises a base having a gripper face, a layer-gripper blade having a working position parallel to the gripper face and parallel to the longitudinal direction and a retracted position parallel to the gripper face and normal to the longitudinal direction, and means for changing the relative spacing between the gripper face and layer-gripper blade to retain a layer of sections therebetween or to release the layer of sections.

* * * * *